(12) United States Patent
Gu et al.

(10) Patent No.: US 11,518,881 B2
(45) Date of Patent: Dec. 6, 2022

(54) POLYSILOXANES IN THERMOPLASTIC ELASTOMER COMPOUNDS FOR OVERMOLDED THERMOPLASTIC ARTICLES

(71) Applicants: PolyOne Corporation, Avon Lake, OH (US); GLS Thermoplastic Alloys (Suzhou) Co., Ltd., Suzhou (CN)

(72) Inventors: Jiren Gu, Crystal Lake, IL (US); Hanxing Wei, Suzhou (CN)

(73) Assignees: Avient Corporation, Avon Lake, OH (US); GLS Thermoplastic Alloys (Suzhou) Co., Ltd., Suzhou (CN)

( * ) Notice: Subject to any disclaimer, the term of this patent is extended or adjusted under 35 U.S.C. 154(b) by 0 days.

(21) Appl. No.: 16/763,170

(22) PCT Filed: Nov. 13, 2017

(86) PCT No.: PCT/CN2017/110677
§ 371 (c)(1),
(2) Date: May 11, 2020

(87) PCT Pub. No.: WO2019/090758
PCT Pub. Date: May 16, 2019

(65) Prior Publication Data
US 2020/0385578 A1 Dec. 10, 2020

(51) Int. Cl.
| C08L 75/00 | (2006.01) |
| B32B 27/28 | (2006.01) |
| B29C 70/68 | (2006.01) |
| C08G 77/16 | (2006.01) |
| C08G 77/445 | (2006.01) |
| C08L 25/08 | (2006.01) |
| C08L 75/04 | (2006.01) |
| C08L 83/06 | (2006.01) |
| C08L 83/10 | (2006.01) |

(52) U.S. Cl.
CPC ............ *C08L 75/00* (2013.01); *B29C 70/68* (2013.01); *B32B 27/283* (2013.01); *C08G 77/16* (2013.01); *C08G 77/445* (2013.01); *C08L 25/08* (2013.01); *C08L 75/04* (2013.01); *C08L 83/06* (2013.01); *C08L 83/10* (2013.01); *B32B 2250/24* (2013.01); *B32B 2270/00* (2013.01); *B32B 2274/00* (2013.01); *B32B 2307/748* (2013.01)

(58) Field of Classification Search
CPC ................................................ B32B 2307/748
See application file for complete search history.

(56) References Cited

U.S. PATENT DOCUMENTS

| 7,015,284 B2 | 3/2006 | Ajbani et al. | |
|---|---|---|---|
| 7,150,919 B2 | 12/2006 | Ajbani et al. | |
| 2005/0148727 A1* | 7/2005 | Ajbani | C08L 53/005 525/63 |
| 2006/0189759 A1 | 8/2006 | Walther et al. | |
| 2009/0162664 A1* | 6/2009 | Ou | B32B 15/00 428/421 |
| 2009/0176045 A1* | 7/2009 | Kanae | C08L 23/08 428/447 |
| 2010/0207365 A1* | 8/2010 | Ohtani | B29C 45/0001 428/53 |
| 2010/0289437 A1* | 11/2010 | Koch | F03H 1/0031 315/506 |
| 2010/0331466 A1 | 12/2010 | Ouhadi | |
| 2014/0011898 A1* | 1/2014 | Qian | C08L 75/04 521/137 |
| 2016/0230000 A1 | 8/2016 | Gu | |
| 2017/0313882 A1* | 11/2017 | Boucard | C08L 23/14 |
| 2020/0216668 A1* | 7/2020 | Bruce | B29C 48/022 |

FOREIGN PATENT DOCUMENTS

| JP | 2002-347178 A | * 12/2002 |
| WO | 2014058822 A1 | 4/2014 |
| WO | 2016079324 A1 | 5/2016 |

OTHER PUBLICATIONS

Product data sheet for Dynasylan Hydrosil 2627.*
Han Zhewen, et al: "Course of Polymer Science," East China University of Technology Press, Feb. 28, 2011, p. 49.
English Translation of Notice of Office Action from China National Intellectual Property Administration, China Patent Application No. 201780096757.7, Mar. 18, 2022 (7 pages, see last paragraph on p. 6).

* cited by examiner

*Primary Examiner* — Marc S Zimmer
(74) *Attorney, Agent, or Firm* — David V. Monateri; Emily E. Vlasek; Michael J. Sambrook

(57) ABSTRACT

An overmolded thermoplastic article includes a substrate portion molded from a thermoplastic resin compound and an overmold portion molded from a thermoplastic elastomer compound. The thermoplastic resin compound includes thermoplastic polymer resin. The thermoplastic elastomer compound includes thermoplastic elastomer and polysiloxane as a mold release agent, and is free of wax. The overmold portion is bonded onto the substrate portion with a peel strength at least comparable to that of an overmolded thermoplastic elastomer compound containing wax as a mold release agent instead of the polysiloxane. Undesirable effects observed with the use of wax as a mold release agent in overmolded thermoplastic elastomer compounds such as blooming and ease of scratching/marring can be reduced, while desirable properties such as silky feel of the surface of the overmold portion and good bonding of the overmold portion onto the substrate portion can be at least maintained.

21 Claims, No Drawings

POLYSILOXANES IN THERMOPLASTIC ELASTOMER COMPOUNDS FOR OVERMOLDED THERMOPLASTIC ARTICLES

FIELD OF THE INVENTION

This invention relates to overmolded thermoplastic articles and the use of polysiloxanes as mold release agents in thermoplastic elastomer compounds for overmolding onto thermoplastic substrates to make overmolded thermoplastic articles.

BACKGROUND OF THE INVENTION

Demand exists for overmolded thermoplastic articles in a variety of markets and product applications. Non-limiting examples include consumer products, electronics and accessories, automotive and transportation, and healthcare and medical. Often, overmolding is used for providing products or parts with improved tactile qualities such as "soft touch" or "silky feel". Increasingly, overmolding is used also to provide products or parts with improved performance or functionality such as vibration damping or impact protection.

Generally, overmolding is an injection molding process whereby one material (an overmold material) such as a thermoplastic elastomer is molded onto a second material (a substrate material) such as a rigid thermoplastic to provide a single product or part. When the overmold material and the substrate material are properly selected, the overmold material forms a strong bond with the substrate material without the need for primers or adhesives.

Thermoplastic elastomers, which can be used as the overmold material, are polymer materials that exhibit elasticity while also being thermoplastic. Thermoplastic elastomers (TPE) can include styrenic block copolymers (SBC), thermoplastic vulcanizates (TPV), thermoplastic polyolefins (TPO), copolyesters (COPE), thermoplastic polyurethanes (TPU), copolyamides (COPA), and olefin block copolymers (OBC).

In use, TPE can be relatively soft and sticky and also can be relatively slow to setup when it is molded. As a result, parts molded from TPE can be relatively difficult to remove from the mold cavity, which is typically made of a metal such as steel. Demolding difficulties can be exacerbated if part design and tooling design are relatively complex. Consequently, mold release agents typically are used with TPE by compounding the mold release agent with the TPE to provide a TPE compound, which then is molded.

Various materials can function as mold release agents to improve demolding of parts molded from TPE by conventional molding processes. However, selecting a mold release agent suitable specifically for overmolding requires special considerations. For example, while some materials can function perfectly well to improve demolding, they also can interfere with bonding between the overmold material and the substrate material. Therefore, many materials known to be suitable as mold release agents in general (i.e., for conventional molding processes) are undesirable specifically for overmolding. For example, it is typically recommended in overmolding processes to avoid the use of mold release sprays and similar lubricants which are applied to the mold cavity because they can interfere with bonding between the substrate material and the overmold material.

Waxes are conventionally used as mold release agents for overmolding TPE. Typically, a wax is compounded with TPE to provide a TPE compound. Then, when a part is molded from the TPE compound, the wax migrates to the surface of the molded part to facilitate release from the mold cavity. Non-limiting examples of waxes that can be used as mold release agents for overmolding TPE include amide waxes such as erucamide (available under the KEMAMIDE E brand), oleanamide (available under the KEMAMIDE U brand), arachidamide/behenamide (available under the KEMAMIDE B brand), and ethylenebisoleamide (available under the GLYCOLUBE VL brand) and montan waxes (i.e., long chain carboxylic acid esters) (available under the STRUKTOL brand).

Although waxes can be useful as mold release agents for overmolding TPE without detrimentally affecting bonding between the overmold material and the substrate material, waxes can have a number of drawbacks. For example, waxes can result in undesirable blooming, which involves phase separation of the wax from the TPE and migration of the wax to the surface of the molded part. Disadvantageously, blooming can manifest as blemishes or spots that are visually observable on the surface of the molded part. Additionally, for example, waxes can result in the surface of the molded part being very susceptible to marring and scratching. Undesirably, wax that migrates to the surface of the molded part can be easily removed, for example, by a human finger nail, which leaves a scratch or mark on the surface of the molded part. Blooming and scratching/marring can be especially problematic when the molded part is colored black or another dark color because the blemishes and scratches resulting from the blooming and scratching/marring often are most readily visually apparent on darker colored surfaces.

SUMMARY OF THE INVENTION

Consequently, a need exists for overmolded thermoplastic articles including a mold release agent that sufficiently facilitates demolding of TPE overmold material without detrimentally affecting bonding between the overmold material and the substrate material while also reducing undesirable blooming and scratching/marring on the surface of the molded part.

The aforementioned needs are met by one or more aspects of the present invention.

One aspect of the invention is an overmolded thermoplastic article including a substrate portion molded from a thermoplastic resin compound and an overmold portion molded from a thermoplastic elastomer compound. The thermoplastic resin compound includes thermoplastic polymer resin. The thermoplastic elastomer compound includes thermoplastic elastomer and polysiloxane as a mold release agent, and is free of wax. The overmold portion is bonded onto the substrate portion with a peel strength at least comparable to that of an overmolded thermoplastic elastomer compound containing wax as a mold release agent instead of the polysiloxane.

Another aspect of the invention is a method of making an overmolded thermoplastic article having a substrate portion and an overmold portion as described herein. The method includes the steps of (a) providing a thermoplastic resin compound including thermoplastic polymer resin; (b) providing a thermoplastic elastomer compound, wherein the thermoplastic elastomer compound comprises (i) thermoplastic elastomer and (ii) polysiloxane, and wherein the thermoplastic elastomer compound is free of wax; (c) molding the thermoplastic resin compound to provide the substrate portion; and (d) overmolding the thermoplastic elastomer compound to provide the overmold portion, wherein the overmold portion is bonded onto the substrate portion at a bond interface, and wherein the bond interface is free of adhesive, thereby providing the overmolded thermoplastic article.

According to aspects of the invention, undesirable effects typically observed with the use of wax as a mold release agent in overmolded thermoplastic elastomer compounds such as blooming and ease of scratching/marring can be reduced, while desirable properties such as silky feel of the surface of the overmold portion and good bonding of the overmold portion onto the substrate portion can be at least maintained.

Features of the invention will become apparent with reference to the following embodiments. There exist various refinements of the features noted in relation to the above-mentioned aspects of the present invention. Additional features may also be incorporated in the above-mentioned aspects of the present invention. These refinements and additional features may exist individually or in any combination. For instance, various features discussed below in relation to any of the described aspects of the present invention may be incorporated into any of the described aspects of the present invention alone or in any combination.

EMBODIMENTS OF THE INVENTION

In some embodiments, the invention is directed to overmolded thermoplastic articles.

In other embodiments, the invention is directed to methods of overmolding to provide overmolded thermoplastic articles.

Required and optional features of these and other embodiments of the present invention are described.

As used herein, the term "free of" a certain component or substance means, in some embodiments, that no amount of that component or substance is intentionally present, and, in other embodiments, that no functionally effective amount of that component or substance is present, and, in further embodiments, that no amount of that component or substance is present.

As used herein, the term "molded from" means, with respect to a component and a material, that the component is molded, shaped, formed, or otherwise made from the material. As such, the term "molded from" means, in some embodiments, the component can comprise, consist essentially of, or consist of, the material; and, in other embodiments, the component consists of the material because the component is, for example, made by an injection molding process.

Overmolded Thermoplastic Article

Some aspects of the invention are directed to overmolded thermoplastic articles.

Overmolded thermoplastic articles include a substrate portion molded from a thermoplastic resin compound and an overmold portion molded from a thermoplastic elastomer compound.

According to the invention, the overmold portion is bonded onto the substrate portion at a bond interface, and the bond interface is free of adhesive.

In some embodiments, the overmold portion is bonded onto the substrate portion with a peel strength at least comparable to that of an overmolded thermoplastic elastomer compound containing wax as a mold release agent instead of the polysiloxane.

For example, in some embodiments, the overmold portion is bonded onto the substrate portion with a peel strength according to ASTM D6862 that is at least about 95% of a control peel strength. The control peel strength is a peel strength according to ASTM D6862 with which a control overmold portion of a control overmolded thermoplastic article is bonded onto a control substrate portion of the control overmolded thermoplastic article. The control overmold portion is molded from a control thermoplastic elastomer compound, and the control thermoplastic elastomer compound is identical to the thermoplastic elastomer except that the polysiloxane is replaced with wax in an amount such that the wax is effective as a mold release agent. The control substrate portion is molded from a control thermoplastic resin compound, and the control thermoplastic resin compound is identical to the thermoplastic resin compound.

For further example, in some embodiments in which the thermoplastic elastomer compound has a Shore A hardness of about 78 according to ASTM D2240, the overmold portion is bonded onto the substrate portion with a peel strength of at least about 40 pounds per linear inch according to ASTM D6862, or at least about 45 pounds per linear inch according to ASTM D6862.

Substrate Portion Molded from Thermoplastic Resin Compound

According to the invention, the substrate portion of the overmolded thermoplastic article is molded from a thermoplastic resin compound.

The thermoplastic resin compound includes one or more thermoplastic polymer resins. In some embodiments, the thermoplastic resin compound further includes one or more optional additives. Thermoplastic resin compounds of the present invention can comprise, consist essentially of, or consist of these ingredients.

In some embodiments, the thermoplastic resin compound includes one or more thermoplastic polymer resins in an amount of about 100 weight percent by weight of the thermoplastic resin compound. That is, in some embodiments, the thermoplastic resin compound is neat thermoplastic polymer resin. In other embodiments, the thermoplastic resin compound includes one or more thermoplastic polymer resins in an amount of, for example, at least about 50 weight percent, or at least about 75 weight percent, or at least about 90 weight percent, or at least about 99 weight percent, or at least about 99.9 weight percent, by weight of the thermoplastic resin compound, and the balance includes one or more optional additives.

Thermoplastic Polymer Resin

According to the invention, the thermoplastic resin compound includes thermoplastic polymer resin.

Suitable thermoplastic polymer resins include conventional or commercially available thermoplastic polymer resins. A thermoplastic polymer resin can be used alone or in combination with one or more other thermoplastic polymer resins.

In some embodiments, the thermoplastic polymer resin is a thermoplastic engineering resin. Non-limiting examples of thermoplastic engineering resins suitable for use in the present invention include polycarbonates, acrylonitrile butadiene styrenes, polyamides, polystyrenes, polyesters, polyoxymethylenes, polyphenylene oxides, and alloys or blends thereof Optional Additives In some embodiments, the thermoplastic resin compound further includes one or more optional additives.

Suitable optional additive include conventional or commercially available plastics additives as described below for the thermoplastic elastomer compound, provided that they are selected and used in amounts that are not wasteful nor detrimental to the processing or performance of the thermoplastic resin compound and/or the overmolded thermoplastic article.

Overmold Portion Molded From TPE Compound

According to the invention, the overmold portion of the overmolded thermoplastic article is molded from a thermoplastic elastomer compound.

The thermoplastic elastomer compound includes thermoplastic elastomer and polysiloxane as a mold release agent. Additionally, according to the invention, the thermoplastic elastomer compound is free of wax. Further, in some embodiments, the thermoplastic elastomer compound includes optional additives.

In some embodiments, the thermoplastic elastomer compound has a Shore A hardness no greater than about 90 according to according to ASTM D2240. In other embodiments, the thermoplastic elastomer compound has a Shore A hardness no greater than about 80, or no greater than about 60, or no greater than about 40, according to according to ASTM D2240.

In some embodiments, the thermoplastic elastomer compound has a Shore A hardness of about 78 according to ASTM D2240. In such embodiments, the overmold portion is bonded onto the substrate portion with a peel strength of at least about 40 pounds per linear inch according to ASTM D6862, or at least about 45 pounds per linear inch according to ASTM D6862.

In some embodiments, undesirable blooming of the polysiloxane does not occur on the surface of the overmold portion. That is, the polysiloxane is not phase separated from the thermoplastic elastomer compound at the surface of the overmold portion.

Thermoplastic Elastomer

According to the invention, the thermoplastic elastomer compound includes thermoplastic elastomer.

Suitable thermoplastic elastomers include conventional or commercially available thermoplastic elastomers. A thermoplastic elastomer can be used alone or in combination with one or more other thermoplastic elastomers.

Non-limiting examples of thermoplastic elastomers suitable for use in the present invention include styrenic block copolymers (SBC), thermoplastic vulcanizates (TPV), thermoplastic polyolefins (TPO), copolyesters (COPE), thermoplastic polyurethanes (TPU), copolyamides (COPA), olefin block copolymers (OBC), and combinations thereof.

In some embodiments, the thermoplastic elastomer is selected from thermoplastic polyurethanes (TPU), copolyesters (COPE), and combinations thereof. Correspondingly, in some embodiments, the thermoplastic elastomer compound is free of styrenic block copolymers (SBC), thermoplastic vulcanizates (TPV), thermoplastic polyolefins (TPO), copolyamides (COPA), and olefin block copolymers (OBC).

In other embodiments, the thermoplastic elastomer is a blend of a primary thermoplastic elastomer and a secondary bonding agent thermoplastic elastomer (i.e., the secondary thermoplastic elastomer functions at least in part as a bonding agent). In such embodiments, the primary thermoplastic elastomer is selected from styrenic block copolymers (SBC), thermoplastic vulcanizates (TPV), thermoplastic polyolefins (TPO), and combinations thereof, and the secondary bonding agent thermoplastic elastomer is selected from thermoplastic polyurethanes (TPU), copolyesters (COPE), and combinations thereof.

In some embodiments, the styrenic block copolymer is selected from styrene-ethylene/butylene-styrene (SEBS) block copolymer, styrene-ethylene/propylene-styrene (SEPS) block copolymer, styrene-ethylene/ethylene/propylene-styrene (SEEPS) block copolymer, styrene-isobutylene-styrene (SIBS) block copolymer, styrene-butadiene-styrene (SBS) block copolymer, styrene-isoprene-styrene (SIS) block copolymer, and combinations thereof.

Polysiloxane

According to the invention, the thermoplastic elastomer compound includes polysiloxane. More commonly, polysiloxanes can be referred to as silicones.

Suitable polysiloxanes include conventional or commercially available polysiloxanes that sufficiently facilitate demolding of the thermoplastic elastomer compound without detrimentally affecting bonding between the overmold portion and the substrate portion while also reducing undesirable blooming and ease of scratching/marring in the surface of the overmold portion of the overmolded thermoplastic article. A polysiloxane can be used alone or in combination with one or more other polysiloxanes.

In some embodiments, the polysiloxane is selected from non-functional polysiloxanes, functional polysiloxanes, and combinations thereof.

In some embodiments, the polysiloxane is a non-functional polysiloxane having a viscosity at 25° C. of about 50 cSt or less. Such polysiloxanes can be characterized as low viscosity non-functional polysiloxane fluids.

Non-limiting examples of commercially available low viscosity non-functional polysiloxane fluids include the XIAMETER PMX-200 (50CS) brand and grade designation available from Dow Corning.

In other embodiments, the polysiloxane is a non-functional polysiloxane having a viscosity at 25° C. of about 350 cSt or less. Such polysiloxanes can be characterized as medium viscosity non-functional polysiloxane fluids.

Non-limiting examples of commercially available medium viscosity non-functional polysiloxane fluids include the XIAMETER PMX-200 (350CS) brand and grade designation available from Dow Corning.

In embodiments of the invention in which the polysiloxane is a low viscosity or medium viscosity non-functional polysiloxane fluid, the polysiloxane is generally present in an amount ranging from about 0.2 to about 4 weight percent by weight of the thermoplastic elastomer compound. In certain embodiments of the invention in which the polysiloxane is a low viscosity or medium viscosity non-functional polysiloxane fluid, the polysiloxane is present in an amount ranging from about 0.5 to about 1.5 weight percent by weight of the thermoplastic elastomer compound.

In further embodiments, the polysiloxane is a functional polysiloxane.

In some embodiments, the functional polysiloxane is dihydroxypolydimethylsiloxane having a viscosity at 25° C. of about 90 cSt. Such polysiloxanes can be characterized as low viscosity polysiloxane fluids functionalized with hydroxyl end groups.

Non-limiting examples of commercially available low viscosity polysiloxane fluids functionalized with hydroxyl end groups include the TEGOMER H-Si 2315 brand and grade designation available from Evonik.

In some embodiments, the functional polysiloxane is a polyester modified polysiloxane having a melting point of about 54° C. Such polysiloxanes can be characterized as solid (at room temperature) polyester modified polysiloxanes.

Non-limiting examples of commercially available solid polyester modified polysiloxanes include the TEGOMER H-Si 6441 P brand and grade designation available from Evonik.

In embodiments of the invention in which the polysiloxane is a functional polysiloxane, the polysiloxane is generally present in an amount ranging from about 0.5 to about 5 weight percent by weight of the thermoplastic elastomer compound. In certain embodiments of the invention in which the polysiloxane is functional polysiloxane, the polysiloxane is generally present in an amount ranging from about 0.5 to about 3 weight percent by weight of the thermoplastic elastomer compound.

Optional Additives

In some embodiments, the thermoplastic elastomer compound includes one or more optional additives.

Suitable optional additive include conventional or commercially available plastics additives. Those skilled in the art of thermoplastics compounding, without undue experimentation, can select suitable additives from available references, for example, E. W. Flick, "Plastics Additives Database," *Plastics Design Library* (Elsevier 2004).

Optional additives can be used in any amount that is sufficient to obtain a desired processing or performance property for the thermoplastic elastomer compound and/or the overmolded thermoplastic article. The amount should not be wasteful of the additive nor detrimental to the processing or performance of the thermoplastic elastomer compound and/or the overmolded thermoplastic article.

Non-limiting examples of additives suitable for use in the present invention include one or more selected from antioxidants and stabilizers; blowing and foaming agents; colorants; flame retardants and smoke suppressants; fillers; impact modifiers; plasticizers; and ultraviolet light absorbers.

Ranges of Ingredients in the TPE Compounds

Table 1 below shows the acceptable, desirable, and preferable ranges of ingredients for various embodiments of the thermoplastic elastomer compounds of the present invention in terms of weight percent based on total weight of the thermoplastic elastomer compound. Other possible ranges of ingredients for certain embodiments of the present invention are as described elsewhere herein.

Thermoplastic elastomer compounds of the present invention can comprise, consist essentially of, or consist of these ingredients. Any number between the ends of the ranges is also contemplated as an end of a range, such that all possible combinations are contemplated within the possibilities of Table 1 as embodiments of compounds for use in the present invention. Unless expressly stated otherwise herein, any disclosed number is intended to refer to both exactly the disclosed number and "about" the disclosed number, such that either possibility is contemplated within the possibilities of Table 1 as embodiments of compounds for use in the present invention.

TABLE 1

| Thermoplastic Elastomer Compound (wt. %) | | | |
| --- | --- | --- | --- |
| Ingredient | Acceptable | Desirable | Preferable |
| Thermoplastic Elastomer | 85 to 99.8 | 90 to 98.5 | 92.5 to 96.5 |
| Polysiloxane | 0.2 to 5 | 0.5 to 3 | 0.5 to 1.5 |
| Optional Additives | 0 to 10 | 1 to 7 | 3 to 6 |

Processing

Preparation of the thermoplastic resin compounds and the thermoplastic elastomer compounds of the present invention is uncomplicated once the proper ingredients have been selected. The compounds can be made in batch or continuous operations.

Mixing in a continuous process typically occurs in an extruder that is elevated to a temperature that is sufficient to melt the polymer matrix with addition of all additives at the feed-throat, or by injection or side-feeders downstream. Extruder speeds can range from about 200 to about 700 revolutions per minute (rpm), and preferably from about 300 rpm to about 500 rpm. Typically, the output from the extruder is pelletized for later processing.

Subsequent preparation of overmolded thermoplastic articles of the present invention also is uncomplicated once thermoplastic resin compounds and thermoplastic elastomer compounds of the present invention are provided.

Overmolding processes are described in available references, for example, Jin Kuk Kim et al. (editors), *Multicomponent Polymeric Materials* (Springer 2016); Dominick V. Rosato et al., *Plastics Design Handbook* (Springer 2013); GLS Corporation, *Overmolding Guide* (2004). Typically, it is recommended for overmolding to avoid the use of mold release sprays and similar lubricants applied to the mold cavity because they can interfere with bonding between the substrate material and the overmold material.

Methods of Making Overmolded Thermoplastic Articles

Some aspects of the invention are directed to methods of making an overmolded thermoplastic article having a substrate portion and an overmold portion.

According to the invention, the method includes the steps of: (a) providing a thermoplastic resin compound; (b) providing a thermoplastic elastomer compound, wherein the thermoplastic elastomer compound comprises (i) thermoplastic elastomer and (ii) polysiloxane, and wherein the thermoplastic elastomer compound is free of wax; (c) molding the thermoplastic resin compound to provide the substrate portion; and (d) overmolding the thermoplastic elastomer compound to provide the overmold portion, wherein the overmold portion is bonded onto the substrate portion at a bond interface, and wherein the bond interface is free of adhesive, thereby providing the overmolded thermoplastic article.

In some embodiments, the overmolding of step (d) is performed in a mold cavity, and the mold cavity is free of a mold release spray or other lubricant including but not limited to a polysiloxane-containing mold release spray. That is, prior to the overmolding of step (d), no mold release spray or other lubricant is sprayed or otherwise applied into the mold cavity.

Overmolded thermoplastic articles made according to the methods described herein can include any combination of the features described herein for the overmolded thermoplastic articles of the present invention.

Usefulness of the Invention

According to aspects of the invention, undesirable effects typically observed with the use of wax as a mold release agent in overmolded thermoplastic elastomer compounds such as blooming and ease of scratching/marring can be reduced, while desirable properties such as silky feel of the surface of the overmold portion and good bonding of the overmold portion onto the substrate portion can be at least maintained.

Overmolded thermoplastic articles of the present invention have potential for a variety of applications in many different industries, including but not limited to: automotive and transportation; electronics and accessories; communications; consumer products; healthcare and medical; household appliances; industrial equipment; personal safety;

sports protection; and other industries or applications benefiting from the article's unique combination of properties.

EXAMPLES

Non-limiting examples of thermoplastic elastomer compounds of various embodiments of the present invention are provided.

Table 2 below shows sources of ingredients for the thermoplastic elastomer compounds of Examples 1 to 14 and Comparative Examples A to E.

TABLE 2

| Ingredient Description | Brand | Source |
|---|---|---|
| Styrene-(ethylene/butylene)-styrene block copolymer | KRATON A1535 | Kraton Polymers |
| White oil | 380 vis oil | Multiple |
| Thermoplastic polyurethane | IROGRAN A85A 4394 UV | Huntsman |
| Color concentrate | CC10190262X0 black | PolyOne |
| Antioxidant | IRGANOX 1010 | BASF |
| Antioxidant | IRGAFOS 168 | BASF |
| Wax | KEMAMIDE E | PMC Biogenix |
| Wax | KEMAMIDE B | PMC Biogenix |
| Polydimethylsiloxane | XIAMETER PMX-200, 50 CS | Dow Corning |
| Polydimethylsiloxane | XIAMETER PMX-200, 350 CS | Dow Corning |
| Dihydroxypolydimethylsiloxane | TEGOMER H-Si 2315 | Evonik |
| Polyester modified siloxane | TEGOMER H-Si 6441 P | Evonik |
| Polycarbonate | LEXAN 141R | Sabic |

Examples of the thermoplastic elastomer compound were compounded and extruded as pellets on a twin extruder at a temperature of 360° F. and a mixing speed of 400 rpm. Subsequently, test specimen plaques were prepared by injection molding and then evaluated for the reported properties.

Shore A hardness was assessed according to ASTM D2240.

Blooming/phase separation was assessed by visual observation of the surface of the test specimen.

Finger nail scratch was assessed by visual observation after the surface of the test specimen was manually scratched with a human finger nail.

Overmolding (OM) peel force was assessed according to ASTM D6862. Test specimens were prepared by overmolding the exemplified thermoplastic elastomer compound onto a substrate of polycarbonate (LEXAN 141R brand available from Sabic) to provide the test specimen.

Table 3 below shows the formulations and certain properties of Comparative Example A.

TABLE 3

|  | Example A | |
|---|---|---|
|  | Wt. Parts | Wt. % |
| Ingredient | | |
| KRATON A1535 | 40 | 6.06 |
| 380 vis oil | 26 | 3.94 |
| IROGRAN A85A 4394 UV | 584 | 88.43 |
| CC10190262X0 black | 6.7 | 1.01 |
| IRGANOX 1010 | 1 | 0.15 |
| IRGAFOS 168 | 0.7 | 0.11 |
| KEMAMIDE E | 1 | 0.15 |
| KEMAMIDE B | 1 | 0.15 |
| XIAMETER PMX-200, 50 CS | — | — |
| XIAMETER PMX-200, 350 CS | — | — |
| TEGOMER H-Si 2315 | — | — |
| TEGOMER H-Si 6441 P | — | — |
| TOTAL | 660.4 | 100.00 |
| Properties | | |
| Hardness (Shore A) (ASTM D2240) | | 78 |
| Blooming/Phase Separation | | No |
| Finger Nail Scratch | | Yes |
| OM Peel Force (pli) (ASTM D6862) | | 45 |

Table 4 below shows the formulations and certain properties of Examples 1 to 3 and Comparative Examples B to C.

TABLE 4

|  | Example | | | | | |
|---|---|---|---|---|---|---|
|  | 1 | | 2 | | 3 | |
|  | Wt. Parts | Wt. % | Wt. Parts | Wt. % | Wt. Parts | Wt. % |
| Ingredient | | | | | | |
| KRATON A1535 | 40 | 6.04 | 40 | 6.01 | 40 | 5.98 |
| 380 vis oil | 26 | 3.93 | 26 | 3.91 | 26 | 3.89 |
| IROGRAN A85A 4394 UV | 584 | 88.24 | 584 | 87.81 | 584 | 87.37 |
| CC10190262X0 black | 6.7 | 1.01 | 6.7 | 1.01 | 6.7 | 1.00 |
| IRGANOX 1010 | 1 | 0.15 | 1 | 0.15 | 1 | 0.15 |
| IRGAFOS 168 | 0.7 | 0.11 | 0.7 | 0.11 | 0.7 | 0.10 |
| KEMAMIDE E | — | — | — | — | — | — |
| KEMAMIDE B | — | — | — | — | — | — |
| XIAMETER PMX-200, 50 CS | 3.4 | 0.51 | 6.7 | 1.01 | 10 | 1.50 |
| XIAMETER PMX-200, 350 CS | — | — | — | — | — | — |
| TEGOMER H-Si 2315 | — | — | — | — | — | — |
| TEGOMER H-Si 6441 P | — | — | — | — | — | — |
| TOTAL | 661.8 | 100.00 | 665.1 | 100.00 | 668.4 | 100.00 |

TABLE 4-continued

| Properties | | | |
|---|---|---|---|
| Hardness (Shore A) (ASTM D2240) | 78 | 78 | 78 |
| Blooming/Phase Separation | No | No | No |
| Finger Nail Scratch | No | No | No |
| OM Peel Force (pli) (ASTM D6862) | 45 | 45 | 43 |

|  | Example | | | |
|---|---|---|---|---|
|  | B | | C | |
|  | Wt. Parts | Wt. % | Wt. Parts | Wt. % |
| Ingredient | | | | |
| KRATON A1535 | 40 | 5.95 | 40 | 5.89 |
| 380 vis oil | 26 | 3.87 | 26 | 3.83 |
| IROGRAN A85A 4394 UV | 584 | 86.93 | 584 | 86.02 |
| CC10190262X0 black | 6.7 | 1.00 | 6.7 | 0.99 |
| IRGANOX 1010 | 1 | 0.15 | 1 | 0.15 |
| IRGAFOS 168 | 0.7 | 0.10 | 0.7 | 0.10 |
| KEMAMIDE E | — | — | — | — |
| KEMAMIDE B | — | — | — | — |
| XIAMETER PMX-200, 50 CS | 13.4 | 1.99 | 20.5 | 3.02 |
| XIAMETER PMX-200, 350 CS | — | — | — | — |
| TEGOMER H-Si 2315 | — | — | — | — |
| TEGOMER H-Si 6441 P | — | — | — | — |
| TOTAL | 671.8 | 100.00 | 678.9 | 100.00 |
| Properties | | | | |
| Hardness (Shore A) (ASTM D2240) | 78 | | 78 | |
| Blooming/Phase Separation | No | | Yes | |
| Finger Nail Scratch | No | | No | |
| OM Peel Force (pli) (ASTM D6862) | 38 | | 28 | |

Table 5 below shows the formulations and certain properties of Examples 4 to 6 and Comparative Examples D to E.

TABLE 5

|  | Example | | | | | |
|---|---|---|---|---|---|---|
|  | 4 | | 5 | | 6 | |
|  | Wt. Parts | Wt. % | Wt. Parts | Wt. % | Wt. Parts | Wt. % |
| Ingredient | | | | | | |
| KRATON A1535 | 40 | 6.04 | 40 | 6.01 | 40 | 5.98 |
| 380 vis oil | 26 | 3.93 | 26 | 3.91 | 26 | 3.89 |
| IROGRAN A85A 4394 UV | 584 | 88.24 | 584 | 87.81 | 584 | 87.37 |
| CC10190262X0 black | 6.7 | 1.01 | 6.7 | 1.01 | 6.7 | 1.00 |
| IRGANOX 1010 | 1 | 0.15 | 1 | 0.15 | 1 | 0.15 |
| IRGAFOS 168 | 0.7 | 0.11 | 0.7 | 0.11 | 0.7 | 0.10 |
| KEMAMIDE E | — | — | — | — | — | — |
| KEMAMIDE B | — | — | — | — | — | — |
| XIAMETER PMX-200, 50 CS | — | — | — | — | — | — |
| XIAMETER PMX-200, 350 CS | 3.4 | 0.51 | 6.7 | 1.01 | 10 | 1.50 |
| TEGOMER H-Si 2315 | — | — | — | — | — | — |
| TEGOMER H-Si 6441 P | — | — | — | — | — | — |
| TOTAL | 661.8 | 100.00 | 665.1 | 100.00 | 668.4 | 100.00 |

TABLE 5-continued

| Properties | | | |
|---|---|---|---|
| Hardness (Shore A) (ASTM D2240) | 78 | 78 | 78 |
| Blooming/Phase Separation | No | No | No |
| Finger Nail Scratch | No | No | No |
| OM Peel Force (pli) (ASTM D6862) | 45 | 45 | 45 |

| | Example | | | |
|---|---|---|---|---|
| | D | | E | |
| | Wt. Parts | Wt. % | Wt. Parts | Wt. % |
| Ingredient | | | | |
| KRATON A1535 | 40 | 5.95 | 40 | 5.89 |
| 380 vis oil | 26 | 3.87 | 26 | 3.83 |
| IROGRAN A85A 4394 UV | 584 | 86.93 | 584 | 86.02 |
| CC10190262X0 black | 6.7 | 1.00 | 6.7 | 0.99 |
| IRGANOX 1010 | 1 | 0.15 | 1 | 0.15 |
| IRGAFOS 168 | 0.7 | 0.10 | 0.7 | 0.10 |
| KEMAMIDE E | — | — | — | — |
| KEMAMIDE B | — | — | — | — |
| XIAMETER PMX-200, 50 CS | — | — | — | — |
| XIAMETER PMX-200, 350 CS | 13.4 | 1.99 | 20.5 | 3.02 |
| TEGOMER H-Si 2315 | — | — | — | — |
| TEGOMER H-Si 6441 P | — | — | — | — |
| TOTAL | 671.8 | 100.00 | 678.9 | 100.00 |
| Properties | | | | |
| Hardness (Shore A) (ASTM D2240) | 78 | | 78 | |
| Blooming/Phase Separation | Yes | | Yes | |
| Finger Nail Scratch | No | | No | |
| OM Peel Force (pli) (ASTM D6862) | 45 | | 45 | |

Table 6 below shows the formulations and certain properties of Examples 7 to 11.

TABLE 6

| | Example | | | | | |
|---|---|---|---|---|---|---|
| | 7 | | 8 | | 9 | |
| | Wt. Parts | Wt. % | Wt. Parts | Wt. % | Wt. Parts | Wt. % |
| Ingredient | | | | | | |
| KRATON A1535 | 40 | 6.04 | 40 | 6.01 | 40 | 5.98 |
| 380 vis oil | 26 | 3.93 | 26 | 3.91 | 26 | 3.89 |
| IROGRAN A85A 4394 UV | 584 | 88.24 | 584 | 87.81 | 584 | 87.37 |
| CC10190262X0 black | 6.7 | 1.01 | 6.7 | 1.01 | 6.7 | 1.00 |
| IRGANOX 1010 | 1 | 0.15 | 1 | 0.15 | 1 | 0.15 |
| IRGAFOS 168 | 0.7 | 0.11 | 0.7 | 0.11 | 0.7 | 0.10 |
| KEMAMIDE E | — | — | — | — | — | — |
| KEMAMIDE B | — | — | — | — | — | — |
| XIAMETER PMX-200, 50 CS | — | — | — | — | — | — |
| XIAMETER PMX-200, 350 CS | — | — | — | — | — | — |
| TEGOMER H-Si 2315 | 3.4 | 0.51 | 6.7 | 1.01 | 10 | 1.50 |
| TEGOMER H-Si 6441 P | — | — | — | — | — | — |
| TOTAL | 661.8 | 100.00 | 665.1 | 100.00 | 668.4 | 100.00 |

TABLE 6-continued

| Properties | | | |
|---|---|---|---|
| Hardness (Shore A) (ASTM D2240) | 78 | 78 | 78 |
| Blooming/Phase Separation | No | No | No |
| Finger Nail Scratch | No | No | No |
| OM Peel Force (pli) (ASTM D6862) | 40 | 45 | 40 |

| | Example | | | |
|---|---|---|---|---|
| | 10 | | 11 | |
| | Wt. Parts | Wt. % | Wt. Parts | Wt. % |
| Ingredient | | | | |
| KRATON A1535 | 40 | 5.95 | 40 | 5.89 |
| 380 vis oil | 26 | 3.87 | 26 | 3.83 |
| IROGRAN A85A 4394 UV | 584 | 86.93 | 584 | 86.02 |
| CC10190262X0 black | 6.7 | 1.00 | 6.7 | 0.99 |
| IRGANOX 1010 | 1 | 0.15 | 1 | 0.15 |
| IRGAFOS 168 | 0.7 | 0.10 | 0.7 | 0.10 |
| KEMAMIDE E | — | — | — | — |
| KEMAMIDE B | — | — | — | — |
| XIAMETER PMX-200, 50 CS | — | — | — | — |
| XIAMETER PMX-200, 350 CS | — | — | — | — |
| TEGOMER H-Si 2315 | 13.4 | 1.99 | 20.5 | 3.02 |
| TEGOMER H-Si 6441 P | — | — | — | — |
| TOTAL | 671.8 | 100.00 | 678.9 | 100.00 |
| Properties | | | | |
| Hardness (Shore A) (ASTM D2240) | 78 | | 78 | |
| Blooming/Phase Separation | No | | No | |
| Finger Nail Scratch | No | | No | |
| OM Peel Force (pli) (ASTM D6862) | 40 | | 40 | |

Table 7 below shows the formulations and certain properties of Examples 12 to 14.

TABLE 7

| | Example | | | | | |
|---|---|---|---|---|---|---|
| | 12 | | 13 | | 14 | |
| | Wt. Parts | Wt. % | Wt. Parts | Wt. % | Wt. Parts | Wt. % |
| Ingredient | | | | | | |
| KRATON A1535 | 40 | 6.04 | 40 | 5.98 | 40 | 5.89 |
| 380 vis oil | 26 | 3.93 | 26 | 3.89 | 26 | 3.83 |
| IROGRAN A85A 4394 UV | 584 | 88.24 | 584 | 87.37 | 584 | 86.02 |
| CC10190262X0 black | 6.7 | 1.01 | 6.7 | 1.00 | 6.7 | 0.99 |
| IRGANOX 1010 | 1 | 0.15 | 1 | 0.15 | 1 | 0.15 |
| IRGAFOS 168 | 0.7 | 0.11 | 0.7 | 0.10 | 0.7 | 0.10 |
| KEMAMIDE E | — | — | — | — | — | — |
| KEMAMIDE B | — | — | — | — | — | — |
| XIAMETER PMX-200, 50 CS | — | — | — | — | — | — |
| XIAMETER PMX-200, 350 CS | — | — | — | — | — | — |
| TEGOMER H-Si 2315 | — | — | — | — | — | — |
| TEGOMER H-Si 6441 P | 3.4 | 0.51 | 10 | 1.50 | 20.5 | 3.02 |
| TOTAL | 661.8 | 100.00 | 668.4 | 100.00 | 678.9 | 100.00 |

TABLE 7-continued

| | Example | | | | | |
| --- | --- | --- | --- | --- | --- | --- |
| | 12 | | 13 | | 14 | |
| | Wt. Parts | Wt. % | Wt. Parts | Wt. % | Wt. Parts | Wt. % |
| Properties | | | | | | |
| Hardness (Shore A) (ASTM D2240) | | 78 | | 78 | | 78 |
| Blooming/Phase Separation | | No | | No | | No |
| Finger Nail Scratch | | No | | No | | No |
| OM Peel Force (pli) (ASTM D6862) | | 43 | | 43 | | 43 |

Without undue experimentation, those having ordinary skill in the art can utilize the written description, including the Examples, to make and use overmolded thermoplastic articles according to the present invention.

All documents cited in the Embodiments of the Invention are incorporated herein by reference in their entirety unless otherwise specified. The citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of the present invention.

What is claimed is:

1. An overmolded thermoplastic article comprising:
a thermoplastic polymer resin substrate portion and
an overmold portion molded from a thermoplastic elastomer compound comprising:
(a) thermoplastic elastomer and
(b) polysiloxane;
wherein the thermoplastic elastomer compound is free of wax;
wherein the overmold portion is bonded onto the substrate portion at a bond interface, and the bond interface is free of adhesive, and
wherein the overmold portion is bonded onto the substrate portion with a peel strength according to ASTM D6862 that is at least about 95% of a control peel strength, wherein the control peel strength is a peel strength according to ASTM D6862 with which a control overmold portion of a control overmolded thermoplastic article is bonded onto a control substrate portion of the control overmolded thermoplastic article;
wherein the control overmold portion is molded from a control thermoplastic elastomer compound, and the control thermoplastic elastomer compound is identical to the thermoplastic elastomer except that the polysiloxane is replaced with wax in an amount such that the wax is effective as a mold release agent, wherein the wax comprises erucamide, arachidamide, and behenamide; and
wherein the control substrate portion is molded from a control thermoplastic resin compound, and the control thermoplastic resin compound is identical to the thermoplastic polymer resin.

2. The article of claim 1, wherein the overmold portion has a surface, and wherein the polysiloxane is not phase separated from the thermoplastic elastomer compound at the surface.

3. The article of claim 1, wherein the polysiloxane is selected from non-functional polysiloxanes, functional polysiloxanes, and combinations thereof.

4. The article of claim 1, wherein the polysiloxane is a non-functional polysiloxane having a viscosity at 25° C. of about 350 cSt or less, and wherein the polysiloxane is present in an amount ranging from about 0.2 to about 4 weight percent by weight of the thermoplastic elastomer compound.

5. The article of claim 4, wherein the polysiloxane is present in an amount ranging from about 0.5 to about 1.5 weight percent by weight of the thermoplastic elastomer compound.

6. The article of claim 4, wherein the polysiloxane is a non-functional polydimethylsiloxane having a viscosity at 25° C. of about 50 cSt or less.

7. The article of claim 1, wherein the polysiloxane is a functional polysiloxane, and wherein the polysiloxane is present in an amount ranging from about 0.5 to about 5 weight percent by weight of the thermoplastic elastomer compound.

8. The article of claim 7, wherein the polysiloxane is present in an amount ranging from about 0.5 to about 3 weight percent by weight of the thermoplastic elastomer compound.

9. The article of claim 7, wherein the functional polysiloxane is dihydroxypolydimethylsiloxane having a viscosity at 25° C. of about 90 cSt or polyester modified polysiloxane having a melting point of about 54° C.

10. The article of claim 1, wherein the thermoplastic elastomer is selected from the group consisting of styrenic block copolymers (SBC), thermoplastic vulcanizates (TPV), thermoplastic polyolefins (TPO), copolyesters (COPE), thermoplastic polyurethanes (TPU), copolyamides (COPA), olefin block copolymers (OBC), and combinations thereof.

11. The article of claim 1, wherein the thermoplastic elastomer is selected from the group consisting of thermoplastic polyurethanes (TPU), copolyesters (COPE), and combinations thereof, and wherein the thermoplastic elastomer compound is free of styrenic block copolymers (SBC), thermoplastic vulcanizates (TPV), and thermoplastic polyolefins (TPO).

12. The article of claim 1, wherein the thermoplastic elastomer is a blend of a primary thermoplastic elastomer and a secondary bonding agent thermoplastic elastomer, wherein the primary thermoplastic elastomer is selected from styrenic block copolymers (SBC), thermoplastic vulcanizates (TPV), thermoplastic polyolefins (TPO), and combinations thereof, and wherein the secondary bonding agent thermoplastic elastomer is selected from thermoplastic polyurethanes (TPU), copolyesters (COPE), and combinations thereof.

13. The article of claim 10, wherein the styrenic block copolymer is selected from the group consisting of styrene-ethylene/butylene-styrene (SEBS) block copolymer, styrene-ethylene/propylene-styrene (SEPS) block copolymer, styrene-ethylene/ethyl ene/propylene-styrene (SEEPS) block copolymer, styrene-isobutylene-styrene (SIBS) block copolymer, styrene-butadiene-styrene (SBS) block copolymer, styrene-isoprene-styrene (SIS) block copolymer, and combinations thereof.

14. The article of claim 1, wherein the thermoplastic elastomer is present in an amount ranging from about 85 to about 99.8 weight percent by weight of the thermoplastic elastomer compound.

15. The article of claim 1, wherein the thermoplastic elastomer compound further comprises one or more additives selected from the group consisting of antioxidants and stabilizers; blowing and foaming agents; colorants; flame retardants and smoke suppressants; fillers; impact modifiers; plasticizers; ultraviolet light absorbers; and combinations thereof.

16. The article of claim 1, wherein the thermoplastic elastomer compound has a Shore A hardness no greater than about 90 according to ASTM D2240.

17. The article of claim 1, wherein the thermoplastic elastomer compound has a Shore A hardness of about 78 according to ASTM D2240, and wherein the overmold portion is bonded onto the substrate portion with a peel strength of at least about 40 pounds per linear inch according to ASTM D6862.

18. The article of claim 1, wherein the thermoplastic polymer resin is a thermoplastic engineering resin selected from the group consisting of polycarbonates, acrylonitrile butadiene styrenes, polyamides, polystyrenes, polyesters, polyoxymethylenes, polyphenylene oxides, and alloys or blends thereof.

19. A method of making an overmolded thermoplastic article having a substrate portion and an overmold portion, the method comprising the steps of:
(a) providing a thermoplastic polymer resin;
(b) providing a thermoplastic elastomer compound comprising (i) thermoplastic elastomer and (ii) polysiloxane, and wherein the thermoplastic elastomer compound is free of wax;
(c) molding the thermoplastic polymer resin to provide the substrate portion; and
(d) overmolding the thermoplastic elastomer compound to provide the overmold portion, wherein the overmold portion is bonded onto the substrate portion at a bond interface, and wherein the bond interface is free of adhesive, thereby providing the overmolded thermoplastic article, and wherein the overmold portion is bonded onto the substrate portion with a peel strength according to ASTM D6862 that is at least about 95% of a control peel strength,
wherein the control peel strength is a peel strength according to ASTM D6862 with which a control overmold portion of a control overmolded thermoplastic article is bonded onto a control substrate portion of the control overmolded thermoplastic article;
wherein the control overmold portion is molded from a control thermoplastic elastomer compound, and the control thermoplastic elastomer compound is identical to the thermoplastic elastomer except that the polysiloxane is replaced with a wax in an amount such that the wax is effective as a mold release agent, wherein the wax comprises erucamide, arachidamide, and behenamide; and
wherein the control substrate portion is a control thermoplastic polymer resin, and the control thermoplastic polymer resin is identical to the thermoplastic polymer resin.

20. An overmolded thermoplastic article comprising:
a thermoplastic polymer resin substrate portion; and an overmold portion molded from a thermoplastic elastomer compound comprising:
(a) thermoplastic elastomer; and
(b) polysiloxane;
wherein the thermoplastic elastomer compound is free of wax;
the overmold portion is bonded onto the substrate portion at a bond interface, and the bond interface is free of adhesive; and
the polysiloxane is a non-functional polysiloxane having a viscosity at 25 ° C. of about 50 cSt or less, and
the polysiloxane is present in an amount ranging from about 0.2 to about 4 weight percent by weight of the thermoplastic elastomer compound.

21. An overmolded thermoplastic article comprising:
a substrate portion molded from a thermoplastic resin compound comprising thermoplastic polymer resin; and
an overmold portion molded from a thermoplastic elastomer compound comprising:
(a) thermoplastic elastomer; and
(b) polysiloxane;
wherein the thermoplastic elastomer compound is free of wax;
the overmold portion is bonded onto the substrate portion at a bond interface, and the bond interface is free of adhesive; and
the polysiloxane is a functional polysiloxane, and wherein the polysiloxane is present in an amount ranging from about 0.5 to about 5 weight percent by weight of the thermoplastic elastomer compound and the functional polysiloxane is dihydroxypolydimethylsiloxane having a viscosity at 25° C. of about 90 cSt or polyester modified polysiloxane having a melting point of about 54° C.

* * * * *